(12) United States Patent
Ayars

(10) Patent No.: US 11,286,664 B2
(45) Date of Patent: Mar. 29, 2022

(54) SUN TRACKING SUN SHADE

(71) Applicant: William C. Ayars, Bay Village, OH (US)

(72) Inventor: William C. Ayars, Bay Village, OH (US)

( * ) Notice: Subject to any disclaimer, the term of this patent is extended or adjusted under 35 U.S.C. 154(b) by 69 days.

(21) Appl. No.: 16/930,199

(22) Filed: Jul. 15, 2020

(65) Prior Publication Data

US 2022/0018124 A1 Jan. 20, 2022

(51) Int. Cl.
*E04B 7/16* (2006.01)
*E04F 10/10* (2006.01)
*G05D 3/12* (2006.01)

(52) U.S. Cl.
CPC .............. *E04B 7/166* (2013.01); *E04B 7/163* (2013.01); *E04F 10/10* (2013.01); *G05D 3/12* (2013.01)

(58) Field of Classification Search
CPC .......... E04B 7/166; E04B 7/163; E04F 10/10; G05D 3/12
See application file for complete search history.

(56) References Cited

U.S. PATENT DOCUMENTS

| 8,413,671 | B2 | 4/2013 | Li | |
| 10,932,535 | B2* | 3/2021 | Du | A45B 23/00 |
| 2005/0016571 | A1* | 1/2005 | Wu | A45B 25/165 |
| | | | | 135/20.1 |
| 2006/0005473 | A1* | 1/2006 | Friedman | E04B 7/163 |
| | | | | 52/24 |
| 2014/0041555 | A1* | 2/2014 | Ramberg | A45B 17/00 |
| | | | | 108/50.12 |

OTHER PUBLICATIONS

Shadecraft Sunflower; https://www.shadecraft.com/sunflower, Jul. 15, 2020.

* cited by examiner

*Primary Examiner* — Beth A Stephan
(74) *Attorney, Agent, or Firm* — Renner, Otto, Boisselle & Sklar, LLP

(57) ABSTRACT

A sun shade includes a cover that is extendable and retractable, a guide rail assembly that is engageable with the cover and defines a first path of movement via a first movable engagement point between the cover and the guide rail assembly, and a support bracket that is engageable with the guide rail assembly and arranged at a lower position relative to the cover. The support bracket defines a second path of movement for the guide rail assembly with the cover via a second movable engagement point between the guide rail assembly and the support bracket.

19 Claims, 5 Drawing Sheets

SUN TRACKING SUN SHADE

FIELD OF INVENTION

The present invention relates to a shading device, and more particularly to an outdoor shading arrangement that is adjustable to accommodate for different positions of the sun throughout a day.

BACKGROUND

Shading devices such as umbrellas and awnings are used outdoors to provide shade from the sun for a user. Shading devices may be used on a patio, lawn, or as part of any other outdoor setting. Conventional shading devices have a predetermined shading area defined by the shape of the shading device such that the device must be re-oriented based on the changing position of the sun throughout the day. Given the sizes and shapes of umbrellas and awnings, the conventional shading devices provide challenges in maneuverability. Moreover, the fixed shape of the devices may have limitations in shading regions, such that the conventional device may be unable to provide shade in some regions throughout the day.

SUMMARY OF INVENTION

A sun shade according to the present application provides an arrangement that is easily maneuverable and enables many different positions of a cover providing a shaded area. The cover is movably engageable with a guide rail assembly that defines a first path of movement for the cover. The guide rail assembly is movably engageable with a fixed support bracket that provides a second path of movement for the guide rail assembly along with the cover. The cover is extendable and retractable along a plane of the cover.

The cover and the guide rail assembly define a movable engagement point along an angular track portion of the guide rail assembly such that the first path of movement is angular. The first path of movement occurs in a vertical plane and the cover is extendable and retractable at any position of the movable engagement point along the angular track portion. The guide rail assembly and the support bracket also define a movable engagement portion. The support bracket is formed such that the second path of movement is also angular and the second path of movement occurs in a horizontal plane. Using the cover, guide rail assembly, and support bracket, the sun shade is movable to many different shading positions that enable the cover to have more degrees of freedom as compared with conventional umbrellas and awnings, such that the sun shade is able to accommodate for different positions of the sun throughout the day and throughout the year.

Operation of the sun shade may be performed manually or automated. Manual operation of the sun shade includes a user manually extending and retracting the cover, sliding the cover along the track portion of the guide rail assembly to a desired position, and sliding the guide rail assembly along the support bracket to a desired position. Mechanical stop mechanisms and/or locking mechanisms may be provided to locate and hold the sun shade components in place at a desired position. The configuration of the sun shade is further advantageous in that a precise sun shading position of the sun shade can be obtained and maintained.

Automation of the sun shade may be performed using a control system integrated into the sun shade. The control system may include a processor, controller, sensors that are arranged on the cover or other components of the sun shade, and a memory with pre-stored positions of the sun shade. The processor may be configured to operate the controller in response to sensed conditions that are indicated by the sensors. The control system may be configured to move the sun shade to the predetermined positions throughout the day based on the time of year and the known sun positions. The automated sun shade is advantageous in enabling further improved maneuverability for a user.

According to an aspect of the invention, a sun shade includes a cover that is extendable and retractable, a guide rail assembly that is configured to movably support the cover and define a first path of movement for the cover, wherein a first movable engagement point is formed between the cover and the guide rail assembly, and a support bracket that is configured to movably support the guide rail assembly and define a second path of movement for the guide rail assembly with the cover, wherein a second movable engagement point is formed between the guide rail assembly and the support bracket.

A method of forming a sun shade includes forming a cover having a planar arrangement of panels that are extendable and retractable relative to each other in a plane of the cover, movably mounting the cover to a track portion of a guide rail assembly at a first movable engagement point having angular movement along a first path of movement defined by the track portion of the guide rail assembly, and movably mounting an arm of the guide rail assembly to a fixed support bracket at a second movable engagement point having angular movement along a second path of movement defined by the fixed support bracket.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

DETAILED DESCRIPTION

Aspects of the present application pertain to shading devices for outdoor areas. The shading device is configured to accommodate for different positions of the sun throughout the day and throughout the year. In other exemplary embodiments, the shading device may be configured to provide a barrier or shelter from rain, wind, or other weather conditions. The shading device may be arranged on any suitable support surface that is found outdoors. For example, patios, porches, decks, driveways, other cement platforms, or grass may provide suitable base surfaces for supporting the shading device. Other support surfaces or applications for the shading device may be suitable.

Figure 1:
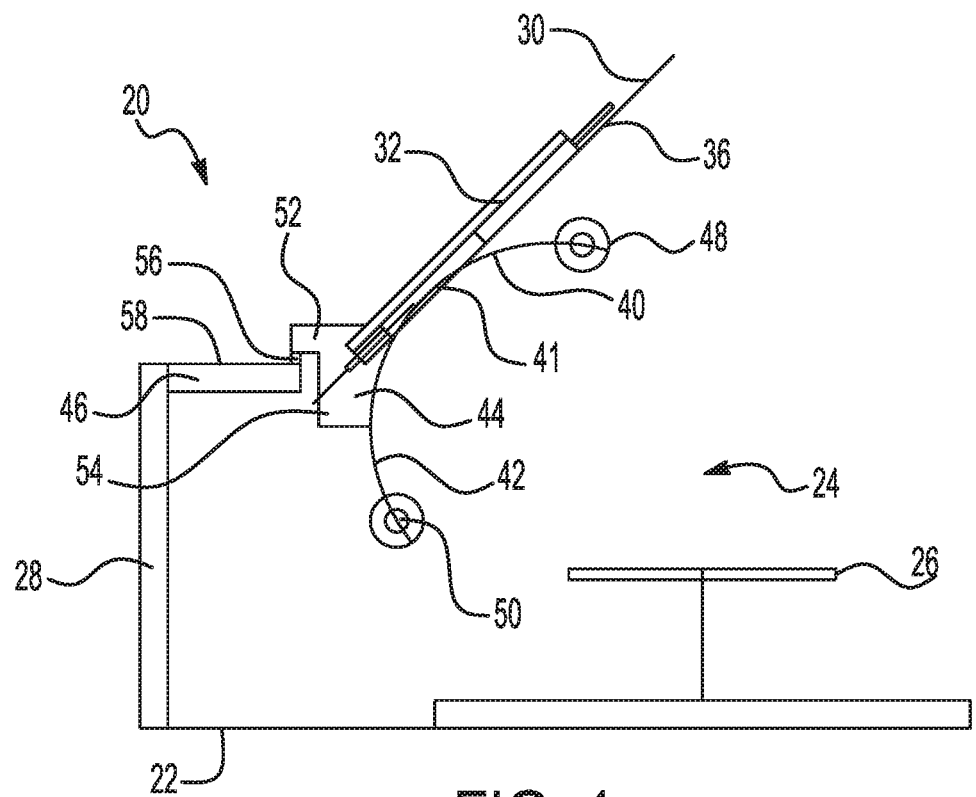
FIG. 1 shows a side view of a sun shade according to a first embodiment of the present application in which the sun shade includes a semi-circular support bracket.
Figure 2:
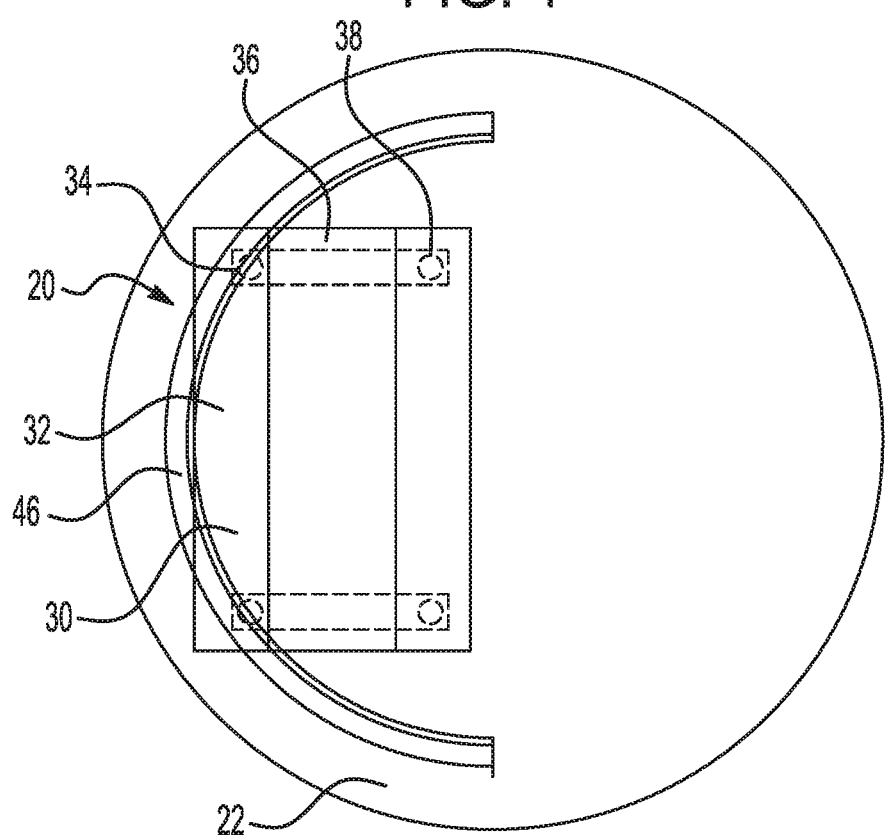
FIG. 2 shows a top view of the sun shade of FIG. 1.
Figure 3:
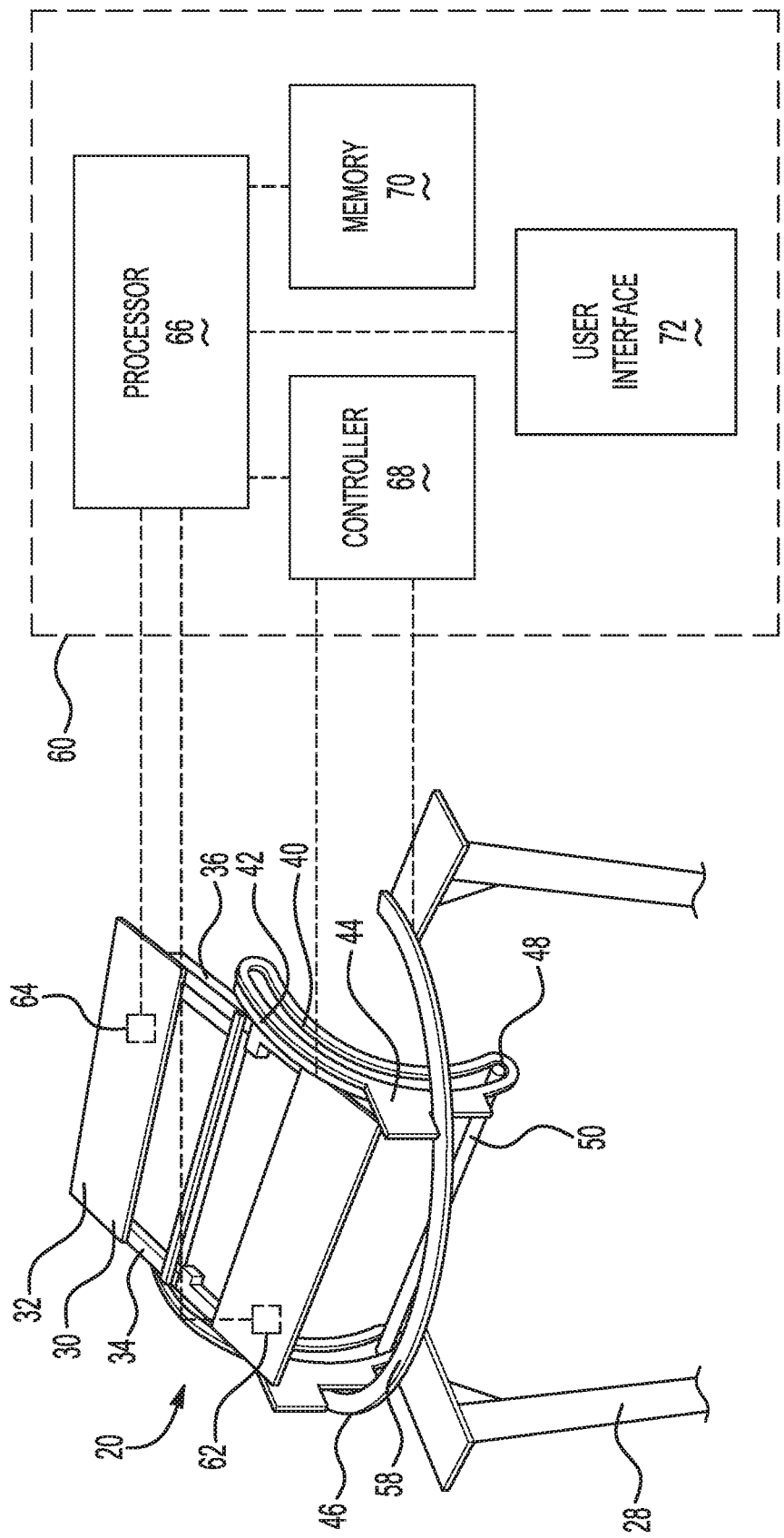
FIG. 3 shows an oblique view of the sun shade of FIG. 1 and an exemplary control system for automated operation of the sun shade.

Referring first to FIGS. 1-3, a sun shade 20 according to an exemplary embodiment is shown. FIG. 1 shows a side view of the sun shade 20, FIG. 2 shows a top view of the sun shade 20, and FIG. 3 shows an oblique view of the sun shade 20. The sun shade 20 is arranged relative to a base surface 22 located outdoors. The base surface 22 may be a patio or any suitable outdoor surface providing an area 24 to be shaded. The area 24 may include a seating area including tables, chairs, etc. An exemplary table 26 is shown for reference in FIG. 1. The area 24 may be any size or shape and the sun shade 20 may be sized up or down as required for a specific area 24. In an exemplary application, the area 24 may be approximately 100 square feet. Areas larger or smaller than 100 square feet are also suitable.

The base surface 22 may be substantially horizontal and the sun shade 20 may include at least one vertical support post 28 that extends upwardly from the base surface 22 and supports the sun shade 20 on the base surface 22. The vertical support post 28 may rest on the base surface 22 or may be secured to the base surface 22 using any suitable mount or fastening device. For example, the vertical support post 28 may be weighted at the bottom of the vertical support post 28. The vertical support post 28 may have any suitable shape, such as cylindrical or rectangular. Any number of vertical support posts 28 may be provided. Any suitable rigid structural material may be used to form the vertical support posts 28. Suitable materials include metal or rigid plastic materials that are configured to withstand different weather conditions, such as cool or warm temperatures and rain. Although the support posts are shown and described herein as vertical support posts, other support posts may be used for other applications. For example, additional support posts for the sun shade 20 may be arranged for attachment to a side wall or overhang.

The sun shade 20 includes a cover 30 that provides the shading area and generally defines a top of the sun shade 20. The cover 30 has a planar arrangement of panels 32 that are extendable and retractable towards and away from each other along the plane of the cover, such that the panels 32 are slidable along the same plane. Any number of panels 32 may be used and the number of panels 32 may be dependent on the size of the sun shade 20. The panels 32 may be rectangular in shape and extend parallel to each other. Other shapes may also be suitable, such as semi-circular or circular panels that are pivotably movable toward and away from each other.

The cover 30 is formed of any suitable awning material such as a fabric material including vinyl, acrylic, polyester, vinyl composite, metal, or any combination thereof. A plain-woven fabric, such as canvas, may be suitable. The material is selected to be light weight for maneuverability by many different users. The material is also selected to withstand different weather conditions. The panels 32 may have any suitable dimensions. The thickness of the panels 32 is relatively thin as compared with the length and the width of the panel 32. The panel 32 may have a thickness that is less than two inches. The panels 32 may include other features for different applications. For example, light-intelligent glass that is configured to darken in response to light, solar or photovoltaic panels, heaters, a lighting system such as embedded LEDs, or a speaker system may all be incorporated into the cover 30.

The panels 32 are slidable along a frame track 34 defined in a base 36 of the cover 30. Each of the panels 32 may have an elongated length that is longer relative to the width of the corresponding panel 32. The frame track 34 may be formed as a groove or slot that extends along a width of the base 36. Opposing grooves or slots may extend along opposing edges of the base 36 such that the moving engagement points of the panel 32 are defined on opposing sides of the panel 32.

The base 36 may have approximately the same length as the panels. The width of the base 36 may be less than the length of the base 36 and greater than a width of the panels 32. The base 36 may have a thickness that is greater than a thickness of the panels 32 such that the base 36 supports all the panels 32. The panels 32 are movable in a direction that is parallel with the direction in which the width of the base 36 extends. In an exemplary embodiment, the panels 32 may have a thickness that is less than two inches, a width that is between one foot and three feet, and a length that is between eight and twelve feet long. Many other dimensions are suitable and the dimensions will be dependent on the configuration of the sun shade 20.

As schematically shown in FIG. 2, each of the panels 32 may include at least one corresponding protrusion 38 or a set of protrusions that extends from the bottom of the panel 32 into the frame track 34 for movement of the panel 32 along the frame track 34. For example, the protrusions 38 may be pins, pillars, posts, tabs or any other suitable engaging element that enables the panel 32 to slide along the frame track 34. The protrusions 38 may be formed with retention elements that prevent the protrusions 38 from escaping the frame track 34. Any sliding-type or pivoting type engagement between the panels 32 and the frame track 34 may be suitable.

The cover 30 is supported for movement on a guide rail assembly 40 via a moving engagement point 41 between the cover 30 and the guide rail assembly 40. The guide rail assembly 40 is formed of any suitable rigid material, such as a metal material or any other temperature-resistant material that is able to withstand various weather conditions. Suitable metals may include stainless steel, aluminum, galvanized steel, brass, copper, bronze, or any other corrosive-resistant metal. The base 36 of the cover 30 is engageable with the guide rail assembly 40 using any suitable connection, such as a pivotable engagement device. The guide rail assembly 40 includes a track portion 42 along which the cover 30 moves and an arm 44 that extends from the track portion 42 to engage a support bracket 46.

The track portion 42 is curved to define an angular first path of movement for the cover 30 via the moving engagement point 41. More than one moving engagement point 41 may be provided such that the cover 30 may be attached to the track portion 42 at more than one location. In an exemplary embodiment, the moving engagement point 41 may be constituted by a pin of the cover 30 that engages into a slot or groove of the track portion 42 and is movable along the slot or groove. Closed ends 48 of the track portion 42 are closed to limit the travel of the cover 30 along the track portion 42. The track portion 42 is semi-elliptical or semi-circular in shape, having any suitable radius. The first path of movement defined by the track portion 42 for the cover 30 may be in a vertical plane that extends perpendicular to the horizontal base surface 22.

The moving engagement point 41 may be formed on the base 36 of the cover 30. The base 36 may be tiltably or pivotably mounted to the track portion 42 busing any suitable connector, such as a tongue and groove connection, ball and socket connection, notching, hinges, joint connection, sliders, etc. The arrangement of the cover 30 and the guide rail assembly 40 is formed to enable extension and retraction of the panels 32 when the movable engagement point 41 is located at any position along the track portion 42. The guide rail assembly 40 may include identical track portions 42 arranged on each side of the cover 30. The track portions 42 may be formed separately or, in other exemplary embodiments, the track portions 42 may be formed as a single monolithic component. At least one connecting bar 50 may extend between the track portions 42. The connecting bar 50 may be supported by the closed end 48 of the track portion 42 and extends horizontally and parallel with the length of the cover 30.

The arm 44 of the guide rail assembly 40 may be formed integrally with the track portion 42 as a single monolithic component. In other exemplary embodiments, the arm 44 may be formed separately and attached to the track portion 42. Each track portion 42 may have a corresponding arm 44 such that the arms 44 are spaced relative to each other. Each arm 44 may be rectilinear in shape, or have any other suitable shape, and the arms 44 may extend vertically in a direction perpendicular to the base surface 22. In an exemplary embodiment, the arm 44 is L-shaped having a first extension 52 that extends horizontally relative to the track portion 42 and rests on the support bracket 46, and a second extension 54 that extends vertically downwardly from the first extension 52 and along the track portion 42.

The support bracket 46 is attached to the vertical support post 28 at a fixed position above the base surface 22. Any height may be suitable and the height will be dependent on the application. For example, the support bracket 46 may be positioned between six and eight feet above the base surface 22. In other exemplary embodiments, the support bracket 46 may be rotatable in a horizontal plane relative to the vertical support post 28.

Any suitable material that is rigid and temperature resistant may be used for the support bracket 46. Metal may be a suitable material, such as stainless steel, aluminum, galvanized steel, brass, copper, or bronze. The guide rail assembly 40 and the support bracket 46 may be formed of the same material or a different material. The support bracket 46 may be arranged at a lower vertical position relative to the cover 30, but the cover 30 may be configured to move below the support bracket 46 along the guide rail assembly 40 which extends below the support bracket 46. In an exemplary embodiment, a maximum extended height of the sun shade 20 may be between 10 and 15 feet. Many other dimensions may be suitable, and the dimensions may be sized up or down depending on the application.

As best shown in FIGS. 2 and 3, the support bracket 46 has a semi-circular or semi-elliptical shape. A diameter of the support bracket 46 may be larger than a length of the cover 30 such that the outer periphery of the support bracket 46 may define an outermost surface of the sun shade 20. In other exemplary embodiments, the support bracket 46 may have a full circular or elliptical shape. The support bracket 46 may have any suitable dimensions, and has a vertical thickness that is thin as compared with the width and the length of the support bracket 46. The width and thickness of the support bracket 46 is constant along the entire length of the support bracket 46. The width may be greater than the thickness and both the width and the thickness may be less than the thickness of the vertical support post 28. For example, the width may be between one and five inches and the thickness may be less than two inches.

The arm 44 of the guide rail assembly 40 may have a protruding pin 56 or a slide member that forms a second movable engagement point 56 along the support bracket 46. In an exemplary embodiment, the protruding pin 56 engages the support bracket 46 for movement along a top surface 58 of the support bracket 46. The pin 56 may protrude vertically downward and into a corresponding groove formed in the top surface 58 of the support bracket 46 for retention of the pin 56. In other embodiments, the arm 44 may have a slide member or clasp type element that slides over the rim of the support bracket 46. The engagement between the pin 56, or other engagement element, and the support bracket 46 enables the arm 44 and the entire guide rail assembly 40 to slide along the angular path of movement defined by the support bracket 46. Still other engagement mechanisms between the arm 44 and the support bracket 46 may be suitable, such as a ball and socket-type joint or any other suitable sliding type mechanism.

In operation, the sun shade 20 may be manually operated or automated. During a manual operation, a user may use the connecting bar 50, or any other part of the guide rail assembly 40, to slide the guide rail assembly 40 horizontally along the support bracket 46 to a desired position. The entire guide rail assembly 40 is movable as a single unit. The user may also move the cover 30 along the track portion 42 of the guide rail assembly 40 to a desired vertically angled position. The guide rail assembly 40 and/or the cover 30 may include any suitable mechanical locking device for fixing the engagement point 41 between the cover 30 and the track portion 42 at a desired position along the guide rail assembly 40. The user may also manually slide the panels 32 along the base 36 to adjust the total width of the cover 30. Another mechanical locking mechanism may be incorporated into the frame track 34 to lock a position of the panels 32 relative to the frame track 34. The materials of the sun shade 20 may be formed to be light weight and easily slidable such that different users are able to move the sun shade 20.

The sun shade 20 may also be implemented with an automated control system, such as the exemplary control system 60 shown in FIG. 3. The control system 60 includes at least one sensor or a plurality of sensors 62, 64 arranged on the sun shade 20. The sensors 62, 64 may be arranged on the cover 30 or at any other suitable location on the sun shade 20. Any suitable sensors may be used, such as light detection or position detection sensors. The sensors 62, 64 are communicatively coupled to a processor 66 of the control system 60 for transmitting sensed data to the processor 66. The processor 66 is configured to send instructions to a controller 68 in response to signals received from the sensors 62, 64. For example, the sensors 62, 64 may continuously or periodically detect the intensity of the sunlight, a position of the sun, or a position of the cover 30.

The controller 68 is communicatively coupled to the guide rail assembly 40 and/or the cover 30 for movement thereof. The control system 60 may include a memory 70 that has stored data pertaining to particular positions of the cover 30 such that the sun shade 20 may automatically move to a specific position according to different positions of the sun at certain times of the day.

A user interface 72 may also be provided as part of the control system 60 and is configured to receive inputs from a user. For example, a user may choose a preset position of the sun shade 20 from the memory 70. The user may also independently move the guide rail assembly 40 and/or the cover 30 via the processor 66. Any suitable interface may be used and the user interface 72 is communicatively coupled to the processor 66. The control system 60 may include a remote controller or an application that is operable from an electronic user device, such as a smart phone or computer.

In another exemplary embodiments, the sensors 62, 64 may be configured to detect when the sun has set and the outside is dark, and the controller 68 may be configured to operate LEDs or other lights sources arranged on the cover 30 in response to the detection of darkness. In still other exemplary embodiments, the sensors 62, 64 may be heat sensors configured to detect a change in temperature, and the controller 68 may be configured to operate a fan or heater in response to the temperature increasing or decreasing beyond a predetermined threshold.

Referring now to FIGS. 4-7, another exemplary embodiment of the sun shade 20' is shown in which the support bracket 46' is formed as a full circular ring. The circular ring is positioned over the area 24' to be shaded, including a table 26*a* and chairs 26*b*. The support bracket 46' may be continuous and formed as a single monolithic component. Four vertical support posts 28' may be evenly spaced along the circumference of the support bracket 46.' Fewer or more than four vertical support posts 28' may be provided. The support posts 28' may be cylindrical in shape. The height of the vertical support posts 28' may be selected to support the support bracket 46' at a height under which a user can access the area 24'. The support posts 28' may each include a base portion 28*a* having a greater thickness than a vertically extending post 28*b* extending upwardly from the base portion 28*a*. In an exemplary embodiment, the base portion 28*a* and vertically extending post 28*b* of the support posts 28' may have a telescoping configuration for adjustment of the height of the support bracket 46'.

A horizontal support member 28*c* of the vertical support post 28' may extend radially inwardly or horizontally from a top portion of the vertically extending post 28*b* for holding the support bracket 46' relative to the base surface. The support bracket 46' may include a stop member 46*a* that is fixed to the support bracket 46' and protrudes downwardly from the support bracket 46'. The stop member 46*a* may be engageable against the horizontal support member 28*c* to limit the rotational path of travel of the support bracket 46' in an embodiment in which the support bracket 46' is engageable. In other exemplary embodiments, a plurality of stop members 46*a* may be provided about the circumference of the support bracket 46' to enable rearrangement of the vertical support posts 28'. The vertical support posts 28' may be arranged closer to each other to enable a larger accessible area between vertical support posts 28'.

Figure 5:
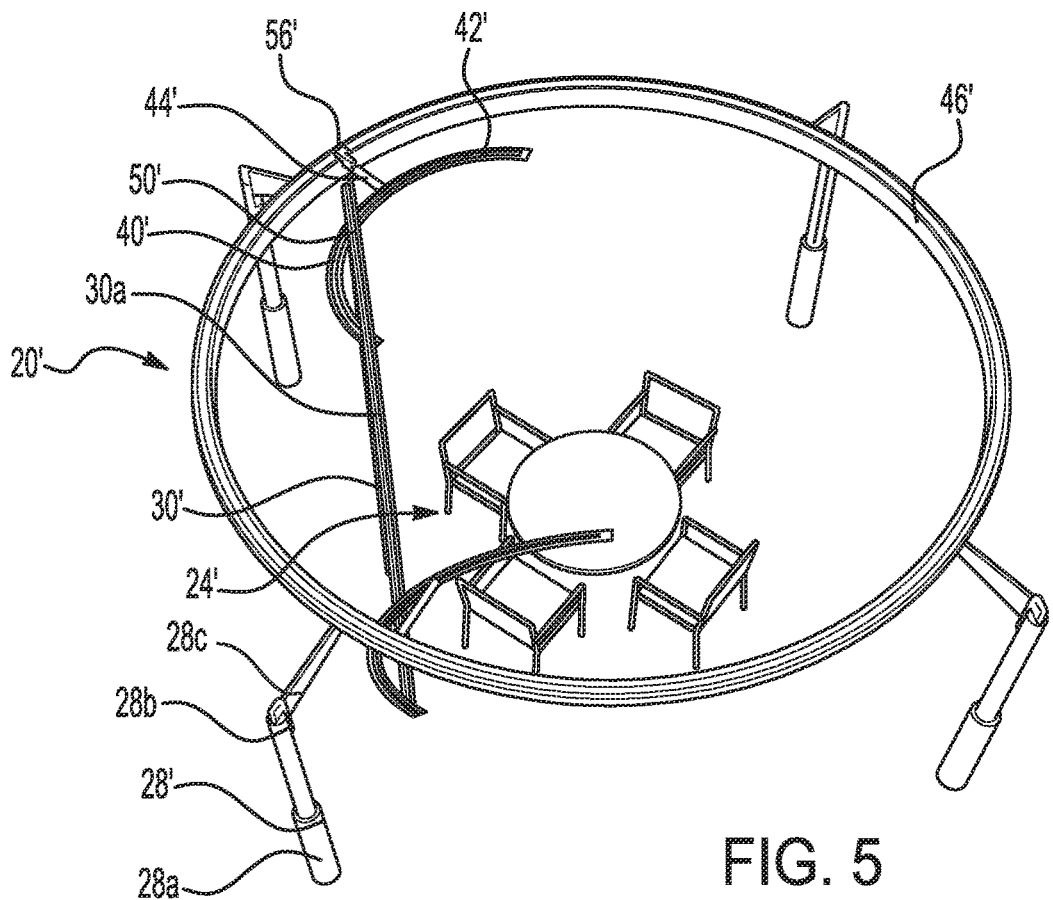
FIG. 5 shows a top view of the sun shade of FIG. 4 in which a cover of the sun shade is in a vertical position.

The guide rail assembly 40' is movably mounted to the support bracket 46' via the arm 44' and the movable engagement point 56' between the guide rail assembly 40' and the support bracket 46', as best shown in FIG. 5. The arm 44' may extend radially inwardly from the support bracket 46' to engage the track portion 42' of the guide rail assembly 40'. The movable engagement point 56' may be formed as a sliding element that is slidable along the rim of the support bracket 46'. In an exemplary embodiment, the rim may include a groove in which a pin or protrusion of the arm 44' may be received, such that the pin and groove constitute the movable engagement point 56'. The configuration of the engagement between the arm 44' and the support bracket 46' enables the guide rail assembly 40 to be moved along the support bracket 46' to any desired position along the angular path defined by the support bracket 46'.

Two or more arms 44' may be provided in the guide rail assembly 40'. The arms 44' have a fixed position relative to each other along the circumference of the support bracket 46' such that the arms 44' are movable as a single unit with the guide rail assembly 40'. The fixed distance between the arms 44' may be less than the radius of the support bracket 46'. Each arm 44' is fixed to a corresponding track portion 42' of the guide rail assembly 40'. A connecting rod or bar 50' extends horizontally between the track portions 42' to position the track portions 42' and thus the arms 44' relative to each other. The connecting bar 50' may also form the engagement point 41' between the cover 30' and the track portions 42'. More than one connecting bar 50' may be provided. Accordingly, the guide rail assembly 40' is movable as a unit along the support bracket 46'.

The track portions 42' are angular in shape and extend above and below the support bracket 46'. The cover 30' is mounted to the track portion 42' and includes a plurality of rectangular panels 32'. The panels 32' are formed of any of the materials previously described. At least one movable engagement point 41' is provided between the cover 30' and the track portion 42'. The engagement point 41' may be formed using a pin that is received in a slot formed by the track portion 42' or any other suitable sliding arrangement. More than one movable engagement point 41' may be provided. For example, the cover 30' may include two movable engagement points 41' along the track portion 42' that are movable together to support the cover 30'. The track portion 42' may include the closed end 48' to limit movement of the cover 30'.

Figure 4:
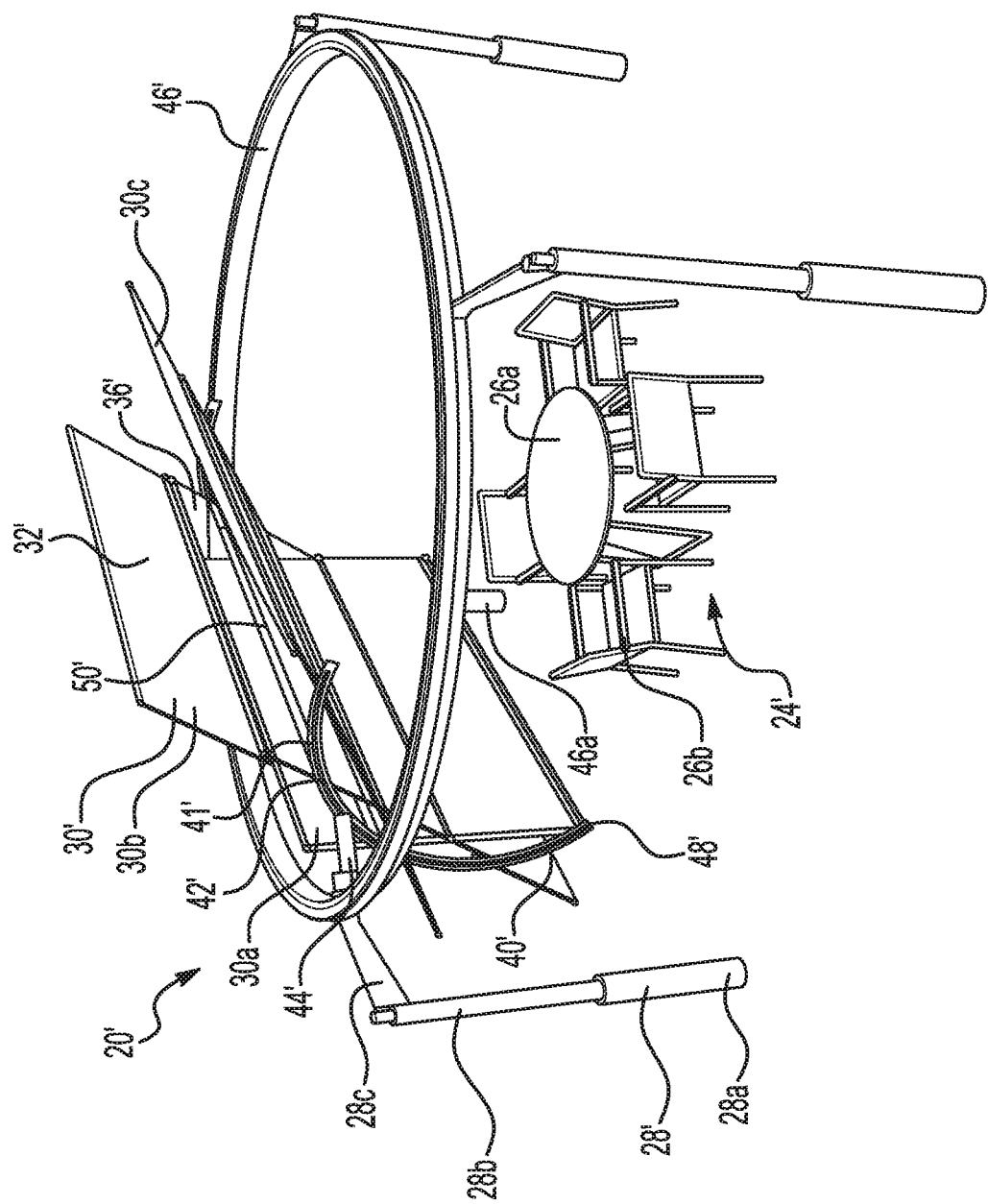
FIG. 4 shows an oblique view of a sun shade according to a second embodiment of the present application in which the sun shade includes a fully circular support bracket.
Figure 7:
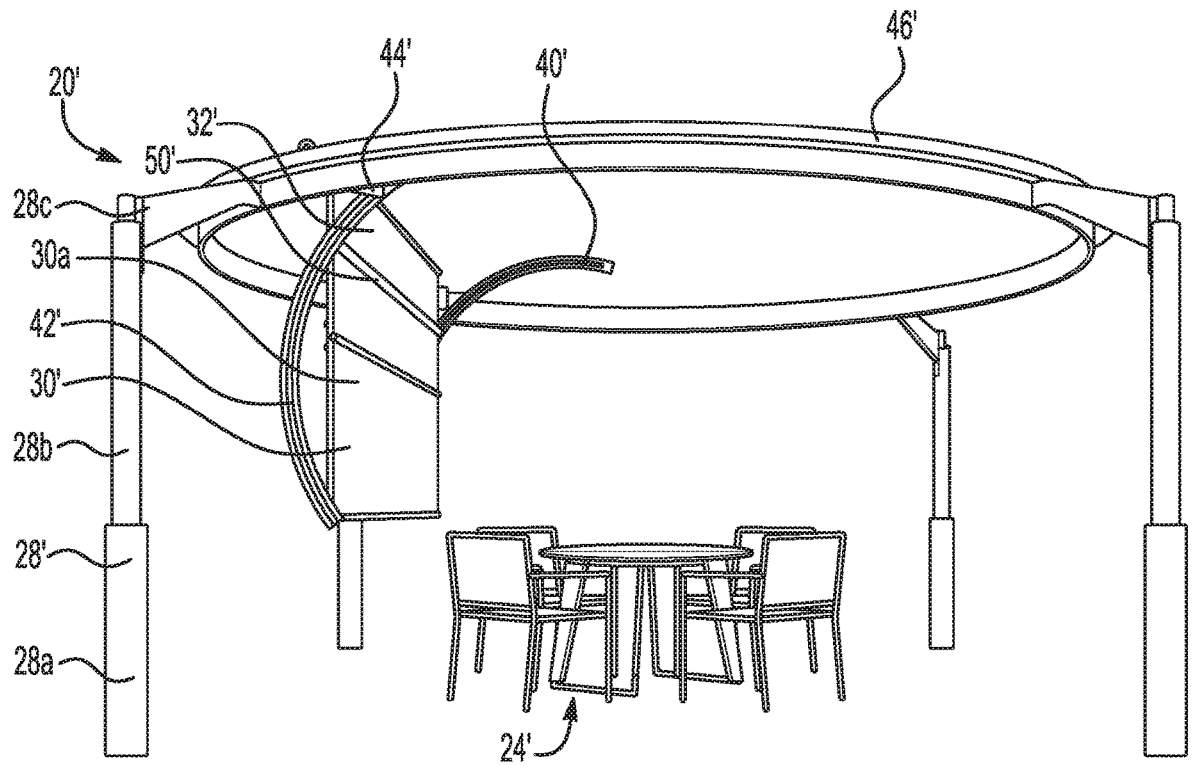
FIG. 7 shows a side view of the sun shade of FIG. 4.

The panels 32' are extendable and retractable in a same plane of the cover 30' relative to a base 36' of the cover 30'. The connecting bar 50' may be secured to the base 36' such that the connecting bar 50' forms the movable engagement point 41'. The panels 32' are dimensioned to have lengths that are smaller than the diameter of the support bracket 46'. Thus, maneuverability of the panels 32' within the support bracket 46' is enabled. Different positions of the cover 30' are shown. A vertical position 30*a* is shown in FIGS. 4, 5, and 7. FIGS. 4 and 7 show the cover 30' in the vertical position 30*a* in which the panels 32' are retracted and engaged toward each other. When retracted in the vertical position 30*a*, at least most of the cover 30' is positioned below the support bracket 46'. When in the vertical position 30*a*, the cover 30' may be extended such that the panels 32' could be extended in a vertical direction.

Figure 6:
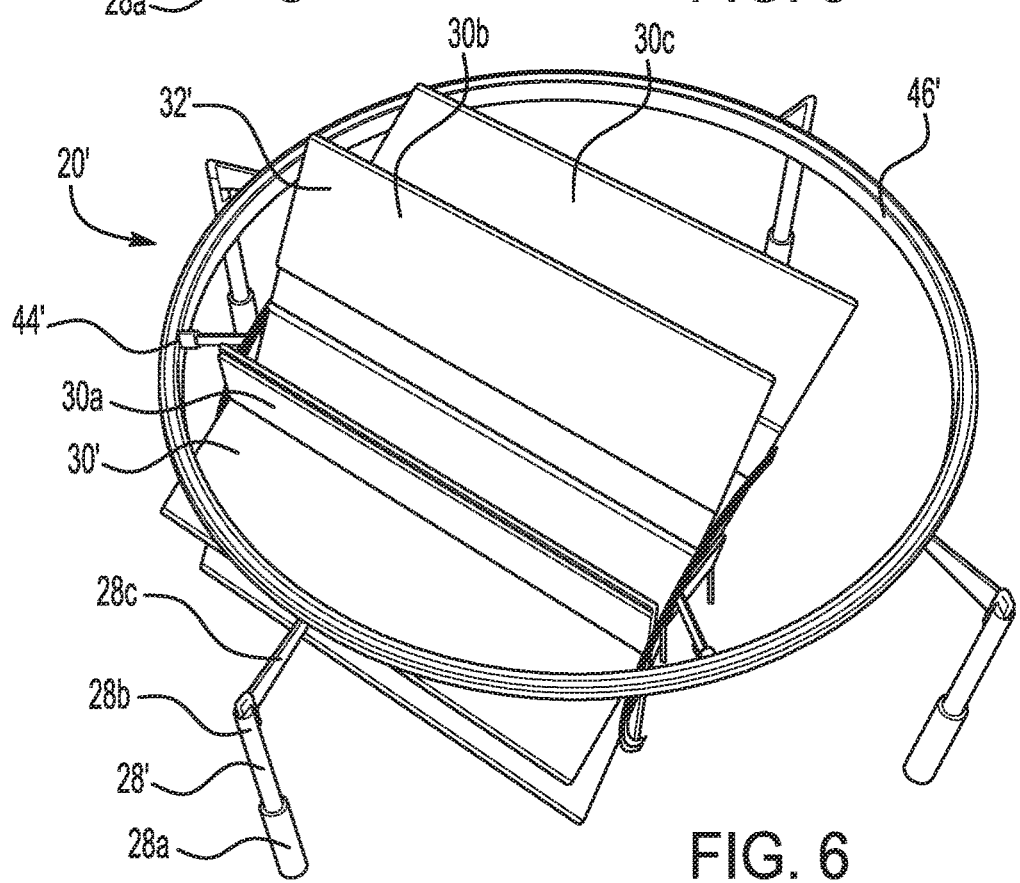
FIG. 6 shows a top view of the sun shade of FIG. 4 in which the cover is shown to have multiple positions.

The cover 30' may be movable along the track portion 42' from the vertical position 30*a* to tilted positions 30*b*, 30*c*, as shown in FIGS. 4 and 6. When in the tilted positions 30*b*, 30*c*, the panels 32' may be extended as shown. The panels 32' may be extended such that the panels 32' extend both above and below the support bracket 46'. Numerous tilted positions may be possible. The cover 30' may be movable between a completely horizontal position that is parallel with the ground and a completely vertical position that is perpendicular relative to the ground. The sun shade 20' may be manually operated or automatically operated using the control system 60 shown in FIG. 3. The sun shade 20' may also include any of the aforementioned features described.

Figure 8:
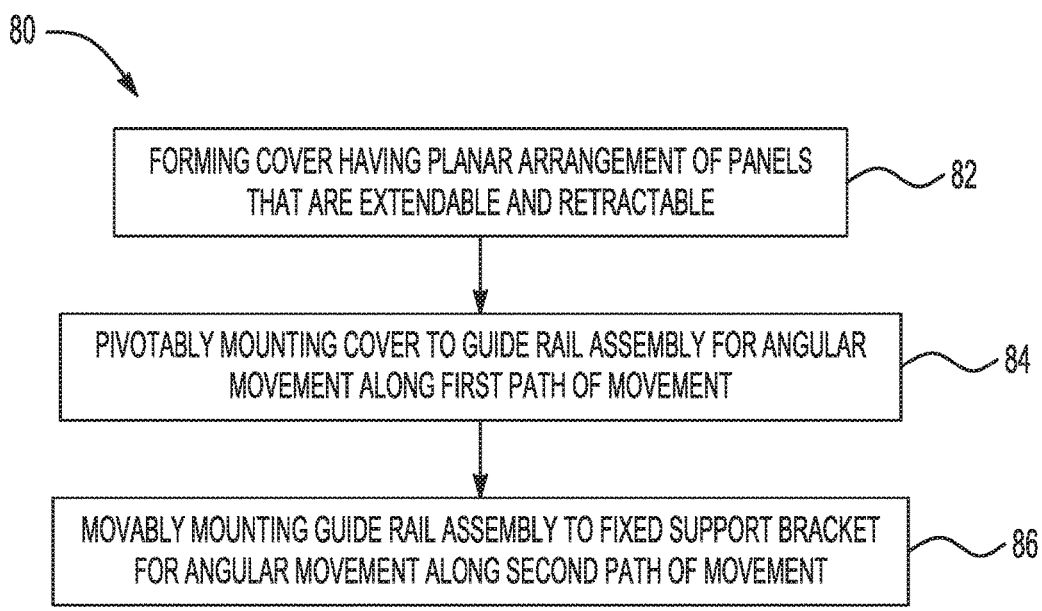
FIG. 8 shows flow chart illustrating a method of forming a sun shade such as the sun shade of FIG. 1 or FIG. 4.

Referring now to FIG. 8, a flowchart illustrating a method 80 of manufacturing a sun shade, such as the sun shade 20, 20' shown in FIGS. 1-7, is shown. Any suitable manufacturing methods and materials may be used such as metal forming processes. Conventional manufacturing methods or additive manufacturing may be suitable. Step 82 of the method 80 includes forming the cover 30, 30' having a planar arrangement of panels 32, 32' that are extendable and retractable relative to each other in a plane of the planar arrangement. The panels 32, 32' may be formed of any suitable awning material that provides shade and the panels 32, 32' may be formed to move along a track portion of a planar base member 36, 36'.

Step 84 of the method 80 includes movably mounting the cover 30, 30' to a guide rail assembly 40, 40' for angular movement along a first path of movement defined by the guide rail assembly 40, 40' via the movable engagement point 41, 41' between the cover 30, 30' and the track portion 42, 42' of the guide rail assembly 40, 40'. The first path of movement may occur along a vertical plane. The guide rail assembly 40, 40' may be formed of a strong and rigid material such as a non-corrosive metal material.

Step 86 of the method 80 includes movably mounting the guide rail assembly 40, 40' to a fixed support bracket 46, 46' for angular movement along a second path of movement defined by the fixed support bracket 46, 46'. The support bracket 46, 46' may be formed of any suitable rigid material such as non-corrosive metal material and has any suitable shape. The angular second path of movement is provided by the support bracket 46, 46' being formed to have a semi-circular, circular, semi-elliptical, or elliptical shape.

The sun shade described herein is advantageous in enabling improved maneuverability and more degrees of freedom as compared with traditional awnings and umbrellas. The moving engagement points and angular paths of movements are configured to facilitate movement of the cover in horizontal and vertical planes. Thus, the sun shade is able to accommodate for all positions of the sun that may occur in a day throughout the year.

A sun shade includes a cover that is extendable and retractable, a guide rail assembly that is configured to movably support the cover and define a first path of movement for the cover, wherein a first movable engagement point is formed between the cover and the guide rail assembly, and a support bracket that is configured to movably support the guide rail assembly and define a second path of movement for the guide rail assembly with the cover, wherein a second movable engagement point is formed between the guide rail assembly and the support bracket.

Both the first path of movement and the second path of movement may be angular.

The first path of movement may be defined in a vertical plane and the second path of movement may be defined in a horizontal plane.

The support bracket may be semi-circular, circular, semi-elliptical, or elliptical in shape.

The second movable engagement point may be movable along at least most of an inner perimeter of the support bracket.

The sun shade may include at least one end stop arranged on the support bracket along the second path of movement.

The guide rail assembly may include a track portion that supports the cover and an arm that extends from the track portion to engage the support bracket.

The cover may be pivotably mounted to the track portion at the first movable engagement point.

The track portion may be curved between two closed ends.

The arm may be rectilinear in shape.

The arm may include a slide member or pin that forms the second movable engagement point with the support bracket.

The guide rail assembly may include two track portions arranged on opposing sides of the cover with each of the two track portions including an arm that extends from the corresponding one of the two track portions.

The guide rail assembly may include a supporting bar extending horizontally between the two track portions.

The sun shade may include at least one vertical support post attached to the support bracket for positioning the sun shade relative to a ground surface.

The cover may include a planar arrangement of panels that are configured to move toward and away from each other along a plane of the planar arrangement.

The cover may include a base member, wherein the panels are movable along a track portion formed in the base member.

The support bracket and the guide rail assembly may be formed of at least one of stainless steel, aluminum, galvanized steel, brass, copper, or bronze.

The cover may be formed of a fabric material including vinyl, acrylic, polyester, vinyl composite, metal, or any combination thereof.

The sun shade may include a control system for automatically operating the sun shade, with the control system including at least one sensor arranged on the cover, a processor communicatively coupled to the at least one sensor, and a controller communicatively coupled to the processor, the guide rail assembly, and the cover, wherein the controller is configured to move the guide rail assembly relative to the support bracket and the cover relative to the guide rail in response to signals received from the at least one sensor.

A method of forming a sun shade includes forming a cover having a planar arrangement of panels that are extendable and retractable relative to each other in a plane of the cover, movably mounting the cover to a track portion of a guide rail assembly at a first movable engagement point having angular movement along a first path of movement defined by the track portion of the guide rail assembly, and movably mounting an arm of the guide rail assembly to a fixed support bracket at a second movable engagement point having angular movement along a second path of movement defined by the fixed support bracket.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A sun shade comprising:
   a cover that is extendable and retractable;
   a guide rail assembly that is configured to movably support the cover and define a first path of movement for the cover, wherein a first movable engagement point is formed between the cover and the guide rail assembly; and
   a support bracket that is configured to movably support the guide rail assembly and define a second path of movement for the guide rail assembly with the cover, wherein a second movable engagement point is formed between the guide rail assembly and the support bracket;

wherein the guide rail assembly includes a track portion that supports the cover and an arm that extends from the track portion to engage the support bracket.

2. The sun shade according to claim 1, wherein both the first path of movement and the second path of movement are angular.

3. The sun shade according to claim 1, wherein the first path of movement is defined in a vertical plane and the second path of movement is defined in a horizontal plane.

4. The sun shade according to claim 1, wherein the support bracket is semi-circular or circular in shape.

5. The sun shade according to claim 4, wherein the second movable engagement point is movable along at least most of an inner perimeter of the support bracket.

6. The sun shade according to claim 1 further comprising at least one end stop arranged on the support bracket along the second path of movement.

7. The sun shade according to claim 1, wherein the cover is pivotably mounted to the track portion at the first movable engagement point.

8. The sun shade according to claim 7, wherein the track portion is curved between two closed ends.

9. The sun shade according to claim 7, wherein the arm is rectilinear in shape.

10. The sun shade according to claim 7, wherein the arm includes a slide member or pin that forms the second movable engagement point with the support bracket.

11. The sun shade according to claim 7, wherein the guide rail assembly includes two track portions arranged on opposing sides of the cover with each of the two track portions including an arm that extends from the corresponding one of the two track portions.

12. The sun shade according to claim 11, wherein the guide rail assembly includes a supporting bar extending horizontally between the two track portions.

13. The sun shade according to claim 1 further comprising at least one vertical support post attached to the support bracket for positioning the sun shade relative to a ground surface.

14. The sun shade according to claim 1, wherein the support bracket and the guide rail assembly are formed of at least one of stainless steel, aluminum, galvanized steel, brass, copper, or bronze.

15. The sun shade according to claim 1, wherein the cover is formed of a fabric material including vinyl, acrylic, polyester, vinyl composite, metal, or any combination thereof.

16. The sun shade according to claim 1 further comprising a control system for automatically operating the sun shade, the control system comprising:

at least one sensor arranged on the cover;

a processor communicatively coupled to the at least one sensor; and a controller communicatively coupled to the processor, the guide rail assembly, and the cover, wherein the controller is configured to move the guide rail assembly relative to the support bracket and the cover relative to the guide rail in response to signals received from the at least one sensor.

17. A method of forming a sun shade, the method comprising:

forming a cover having a planar arrangement of panels that are extendable and retractable relative to each other in a plane of the cover;

movably mounting the cover to a track portion of a guide rail assembly at a first movable engagement point having angular movement along a first path of movement defined by the track portion of the guide rail assembly; and movably mounting an arm of the guide rail assembly to a fixed support bracket at a second movable engagement point having angular movement along a second path of movement defined by the fixed support bracket.

18. A sun shade comprising:

a cover that is extendable and retractable;

a guide rail assembly that is configured to movably support the cover and define a first path of movement for the cover, wherein a first movable engagement point is formed between the cover and the guide rail assembly; and a support bracket that is configured to movably support the guide rail assembly and define a second path of movement for the guide rail assembly with the cover, wherein a second movable engagement point is formed between the guide rail assembly and the support bracket, and wherein the cover includes a planar arrangement of panels that are configured to move toward and away from each other along a plane of the planar arrangement.

19. The sun shade according to claim 18, wherein the cover includes a base member, wherein the panels are movable along a track portion formed in the base member.

* * * * *